ововATE# United States Patent Office 3,317,595
Patented May 2, 1967

3,317,595
LINEAR SUBSTITUTED PHOSPHONITRILIC DERIVATIVES
Kazimiera J. L. Paciorek, Riverside, Calif., assignor to the United States of America as represented by the Secretary of the Navy
No Drawing. Filed Sept. 13, 1963, Ser. No. 308,916
5 Claims. (Cl. 260—551)

The invention herein described may be manufactured and used by or for the Government of the United States of America for governmental purposes without the payment of any royalties thereon or therefor.

The purpose of the invention disclosed herein is to provide a general method for the preparation of substituted, and particularly phenyl substituted, linear phosphonitrilic derivatives. Depending on the reagents selected, these materials comprise thermally stable, liquids and solids, of exactly known molecular weights and structure; terminated by groups resistant to oxidation and hydrolysis. Thus these systems can be employed as lubricants and sealants where oxidative, hydrolytic and high temperature stability is required.

The number of publications and patents pertaining to the preparation and uses of linear phosphonitrilic derivatives is great; a few of these references are: Paddock and Searle, Advances in Inorganic Chemistry and Radio Chemistry, volume I, Academic Press, 1959; M. Becke-Goehring, German Patent 1,059,186; N. L. Paddock, Canadian Patent 575,069, Apr. 28, 1959; L. V. Gregor and J. A. Parkins, U.S. Patent 2,998,297, Aug. 29, 1961; F. G. R. Gimblett, J. Polymer Sci., 60, S26–S31 (1962). These and other prior disclosures are concerned mainly with chlorine substituted phosphonitrilic materials. In these formulations the end groups are not well characterized nor are these substances of a uniform molecular weight. Furthermore, it has not been rigidly proven that the so-called linear materials do not embody also some cyclics.

The methods disclosed in this invention have not been described previously.

It is an object of the invention to provide new procedures for the preparation of substituted, linear phosphonitrilic derivatives;

Another object of the present invention is to provide the synthesis of

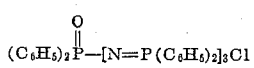

A further object of the invention is to provide the synthesis of

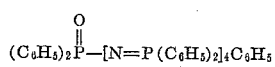

Still another object of the invention is to provide the synthesis of

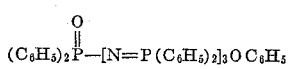

Other objects and many of the attendant advantages of this invention will become readily appreciated as the same becomes better understood by reference to the following detailed description.

The present invention provides a general procedure for the preparation of intermediates of the type:

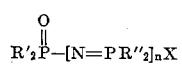

where R' could be either alkyl, aryl, alkoxy, aryloxy group or their fluorinated analogues; R" is either alkyl, aryl, aryloxy or alkoxy group or their fluorinated analogues; X is a halogen, preferably chlorine; and $n$ is any integer whose magnitude is determined by the solubility of the end product in the reaction medium. The solvent employed can be either pentane, benzene, nitrobenzene, s-tetrachloroethane, acetonitrile or ether. R' could be identical with R", however, to procure liquid derivatives R' and R" should be different.

The process taking place can be best represented as follows:

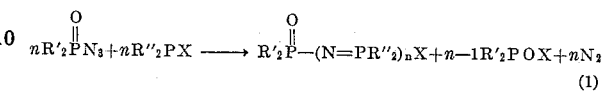

(1)

The particular compound described in Example I is

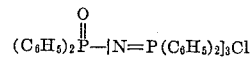

made from diphenylphosphonyl azide and diphenylphosphinous chloride in refluxing ether. (This type of a chlorine terminated intermediate itself is not hydrolytically stable. To provide the inherent hydrolytic and thermal stability suitable end groups and extending groups have been chosen, as indicated later in the disclosure.)

EXAMPLE I

To 5.0 g. of diphenylphosphonyl azide dissolved in 60 ml. of anhydrous ether was added 4.5 g. of diphenylphosphinous chloride. This operation was conducted in an inert atmosphere enclosure. Subsequently the solution was refluxed under a blanket of dry nitrogen for 7 days. A white precipitate was formed on the walls of the flask. This material was filtered, refluxed with acetonitrile and again filtered, 3.5 g. (62% yield) of

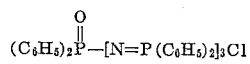

was afforded M.P. 338–345° C.

*Analysis.*—Calc. for C₄₈H₄₀P₄N₃C₁₀: C, 69.11; H, 4.83; P, 14.85; N, 5.04; Cl, 4.25. Found: C, 69.05; H, 4.85; P, 14.82; N, 5.35; Cl, 4.35.

This material is used as a starting material for the invention described in copending application Ser. No. 308,917 filed Sept. 13, 1963 now U.S. Patent No. 3,249,635, granted May 3, 1966, for Phosphonitrilic Oxygen Terminated Derivatives.

This invention also discloses how to prepare pseudohalogen, preferably N₃ terminated secondary intermediates of the general structure

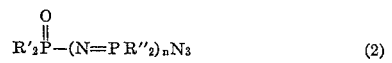

(2)

where R' could be either alkyl, aryl, alkoxy or aryloxy or their fluorinated analogues and R" could be either alkyl, aryl, alkoxy, aryloxy or their fluorinated analogues, whereas $n$ can be any integer.

The process to prepare the azide intermediate can be represented as follows:

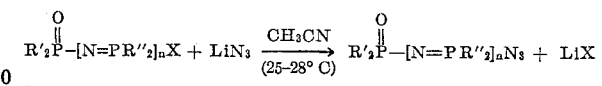

From the reaction of

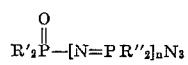

with monophosphines such as R'''R^{IV}R^{V}P material of the structure

is formed. The groups R''', R^{IV}, and R^{V} can all be the same or different and these can be either alkyl, aryl, aryloxy, alkoxy, their fluorinated analogues, hydrogen or halogen. The particular preparation described in Example II concerns the formation of $$(C_6H_5)_2\overset{O}{\overset{\|}{P}}-[N=P(C_6H_5)_2]_4C_6H_5 \qquad (3)$$

via the reaction of $$(C_6H_5)_2\overset{O}{\overset{\|}{P}}-[N=P(C_6H_5)_2]_3Cl$$

with lithium azide in acetonitrile at room temperature followed by treatment with triphenylphosphine in benzene.

EXAMPLE II

In an inert atmosphere enclosure to a rapidly stirred suspension of 1.2 g. of $$(C_6H_5)_2\overset{O}{\overset{\|}{P}}-[N=P(C_6H_5)_2]_3Cl$$

in 40 ml. of acetonitrile was added 0.2 g. of lithium azide at such a rate that the temperature was maintained at 28° C. During the addition most of the suspended solid had dissolved, only a small quantity of fine precipitate could be observed. An amorphous solid was left on removal of the solvent; its infrared spectrum exhibited a strong band at $4.70\mu$ indicative of an azide linkage. The product $$(C_6H_5)_2\overset{O}{\overset{\|}{P}}-[N=P(C_6H_5)_2]_3N_3$$

1.05 g. was dissolved in 20 ml. of benzene, then 0.85 g. of triphenylphosphine was added and the resulting mixture was refluxed overnight under blanket of nitrogen. The solvent and excess of triphenylphosphine were removed by heating in vacuo at 80° C. The residue was crystallized from acetonitrile-ethanol mixture yielding 1.00 g. (80% yield) of $$(C_6H_5)_2\overset{O}{\overset{\|}{P}}-[N=P(C_6H_5)_2]_4C_6H_5, \text{ M.P. } 157\text{--}160°\text{ C.}$$

*Analysis.*—Calc. for $C_{66}H_{55}P_5N_4O$: C, 73.72; H, 5.16; P, 14.41; N, 5.21; O, 1.49; mol. wt., 1052. Found: C, 73.85; H, 5.36; P, 14.43; N, 5.39; O, 1.42. Molecular weight 1075 in chloroform using Mechrolab Osmometer.

To extend chains instead of monophosphine a diphosphine such as $$R'''R^{IV}P-R-PR'''R^{IV} \text{ or } R'''R^{IV}-P-P-R'''R^{IV}$$

is used, whereupon a moiety of the general formulae $$R'_2\overset{O}{\overset{\|}{P}}-(N=PR''_2)_n-N=\underset{R^{IV}}{\overset{R'''}{\overset{|}{P}}}-R-\underset{R^{IV}}{\overset{R'''}{\overset{|}{P}}}=N-(PR''_2=N)_n-\overset{O}{\overset{\|}{P}}R'_2$$

and $$R'_2\overset{O}{\overset{\|}{P}}-(N=PR''_2)_n-N=\underset{R^{IV}}{\overset{R'''}{\overset{|}{P}}}-\underset{R^{IV}}{\overset{R'''}{\overset{|}{P}}}=N-(PR''_2=N)_n\overset{O}{\overset{\|}{P}}R'_2$$

are obtained from respective reactions as follows:

$$2R'_2\overset{O}{\overset{\|}{P}}-(N=PR''_2)_n-N_3 + R'''R^{IV}P-R-PR'''R^{IV} \xrightarrow[\text{(70°--150°C.)}]{\text{refluxing solvent}}$$

$$R'_2\overset{O}{\overset{\|}{P}}-(N=PR''_2)_n-N=\underset{R^{IV}}{\overset{R'''}{\overset{|}{P}}}-R-\underset{R^{IV}}{\overset{R'''}{\overset{|}{P}}}=N-(PR''_2=N)_n-\overset{O}{\overset{\|}{P}}R'_2 + 2N_2$$

$$2R'_2\overset{O}{\overset{\|}{P}}-(N=PR''_2)_n-N_3 + R'''R^{IV}P-PR'''R^{IV} \xrightarrow[\text{70--150°C.}]{\text{refluxing solvent}}$$

$$R'_2\overset{O}{\overset{\|}{P}}-(N=PR''_2)_n-N=\underset{R^{IV}}{\overset{R'''}{\overset{|}{P}}}-\underset{R^{IV}}{\overset{R'''}{\overset{|}{P}}}=N-(PR'_2=N)_n-\overset{O}{\overset{\|}{P}}R'_2 + 2N_2$$

where the substituents R', R'', R''' and $R^{IV}$ can be identical or different and these groups can be either alkyl, aryl, alkoxy, aryloxy, their fluorinated analogues, hydrogen or halogen, and whereas the bridging group R is preferably phenyl, biphenyl or naphthyl.

The preparation of aryloxy or alkoxy terminated chains is represented by the process as follows:

$$R'_2\overset{O}{\overset{\|}{P}}(N=PR''_2)_nX + HOR''' \xrightarrow[\text{(100--200°C.)}]{\text{refluxing solvent}}$$

$$R'_2\overset{O}{\overset{\|}{P}}-(N=PR''_2)_n-O-R''' + HX$$

where R''' is either an alkyl or aryl group, represented by compounds such as phenol, substituted phenols, aliphatic alcohols and their fluorinated analogues. The solvents employed being aromatic, such as toluene, xylene, benzene and other substituted benzenes.

The particular compound described in Example III, below is $$(C_6H_5)_2\overset{O}{\overset{\|}{P}}-[N=P(C_6H_5)_2]_3OC_6H_5 \qquad (4)$$

This material was made by treatment of $$(C_6H_5)_2\overset{O}{\overset{\|}{P}}-[N=P(C_6H_5)_2]_3Cl$$

with sodium phenoxide in xylene.

EXAMPLE III

To 30 ml. of anhydrous xylene was added 0.060 g. of finely divided sodium followed by 0.6 g. of phenol and 2.10 g. of $$(C_6H_5)_2\overset{O}{\overset{\|}{P}}-[N=P(C_6H_5)_2]_3Cl$$

The resulting mixture was refluxed overnight; xylene and the excess of phenol were removed by heating in vacuo at 120° C., the product $$(C_6H_5)_2\overset{O}{\overset{\|}{P}}-[N=P(C_6H_5)_2]_3OC_6H_5$$

1.7 g. (75% yield) was crystallized from ether-heptane M.P., 65–70° C.

*Analysis.*—Calc. for $C_{54}H_{45}P_4N_3O_2$: C, 72.72; H, 5.09; P, 13.89; N, 4.71. Found: C, 71.67; H, 5.32; P, 13.23; N, 4.50.

In the infrared spectrum a band at $10.85\mu$ confirmed the presence of phenoxy linkage.

To extend chains instead of monofunctional reagents difunctional compounds are chosen, whereupon materials of the general formula $$R'_2\overset{O}{\overset{\|}{P}}-(N=PR''_2)_n-O-R-O-(PR''_2=N)_n-\overset{O}{\overset{\|}{P}}R'_2$$

are obtained from the reaction as follows:

$$2R'_2\overset{O}{\overset{\|}{P}}-(N=PR''_2)_nX + HO-R-OH \xrightarrow[\text{(100--200°C.)}]{\text{refluxing solvent}}$$

$$R'_2\overset{O}{\overset{\|}{P}}-(N=PR''_2)_n-O-R-O-(PR''_2=N)_n-\overset{O}{\overset{\|}{P}}R'_2 + 2HX$$

The bridging group R can be either aryl or alkyl, more exactly, for example the dihydroxy reagent could be either hydroquinone, 4,4'-dihydroxybiphenyl, ethylene glycol and their fluorinated analogues; R' and R''=alkyl, aryl, alkoxy, aryloxy or their fluorinated analogues, whereas $n$ can be any integer, and X=halogen. The solvents employed being aromatic, such as toluene, xylene, benzene and other substituted benzenes.

Obviously many modifications and variations of the present invention are possible in the light of the above teachings. It is therefore to be understood that within the scope of the appended claims the invention may be practiced otherwise than as specifically described.

What is claimed is:
1. The method for preparing the compound

$$(C_6H_5)_2\overset{O}{\overset{\|}{P}}-[N=P(C_6H_5)_2]_3Cl$$

comprising reacting a solution of diphenylphosphonyl azide dissolved in anhydrous ether with diphenylphosphinous chloride in an inert atmosphere and the subsequent refluxing thereof until a white precipitate is formed which after purification yields

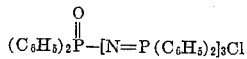

having a melting point of 338–345° C.

2. The compound

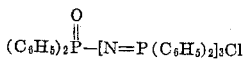

3. The compound

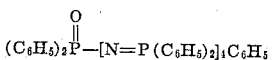

4. The method for producing the compound

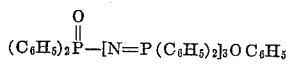

comprising reacting in an anhydrous solvent a stoichiometric amount of finely divided alkali metal with molar quantities of phenol and

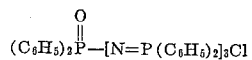

by refluxing at least at 135° C. in an inert atmosphere to produce

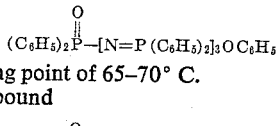

having a melting point of 65–70° C.

5. The compound

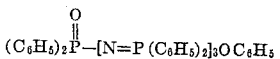

References Cited by the Examiner

UNITED STATES PATENTS 3,189,564  6/1965  Washburn et al. _____ 260—2

WALTER A. MODANCE, *Primary Examiner.*

HARRY I. MOATZ, *Assistant Examiner.*